(12) United States Patent
Yavid

(10) Patent No.: US 10,571,574 B1
(45) Date of Patent: Feb. 25, 2020

(54) HYBRID LADAR WITH CO-PLANAR SCANNING AND IMAGING FIELD-OF-VIEW

(71) Applicant: Dmitriy Yavid, Stony Brook, NY (US)

(72) Inventor: Dmitriy Yavid, Stony Brook, NY (US)

(73) Assignee: Red Creamery, LLC, Massapequa, NY (US)

( * ) Notice: Subject to any disclaimer, the term of this patent is extended or adjusted under 35 U.S.C. 154(b) by 456 days.

(21) Appl. No.: 15/432,105

(22) Filed: Feb. 14, 2017

Related U.S. Application Data

(60) Provisional application No. 62/295,210, filed on Feb. 15, 2016.

(51) Int. Cl.
| | |
|---|---|
| *G01C 3/08* | (2006.01) |
| *G01S 17/89* | (2020.01) |
| *G01S 7/4863* | (2020.01) |
| *G01S 7/481* | (2006.01) |
| *G01S 7/4865* | (2020.01) |

(52) U.S. Cl.
CPC .......... *G01S 17/89* (2013.01); *G01S 7/4817* (2013.01); *G01S 7/4863* (2013.01); *G01S 7/4865* (2013.01)

(58) Field of Classification Search
CPC ...... G01S 17/89; G01S 7/4863; G01S 7/4865; G01S 7/4817
USPC ...................................................... 356/5.01
See application file for complete search history.

(56) References Cited

U.S. PATENT DOCUMENTS

| | | | |
|---|---|---|---|
| 5,870,180 A | * | 2/1999 | Wangler .................. G01S 17/89 356/4.01 |
| 6,882,409 B1 | | 4/2005 | Evans |
| 7,190,854 B1 | | 3/2007 | Novotny |
| 8,767,190 B2 | | 7/2014 | Hall |
| 8,829,417 B2 | | 9/2014 | Krill |
| 8,976,340 B2 | | 3/2015 | Gilliland |
| 9,366,938 B1 | | 6/2016 | Anderson |
| 9,383,753 B1 | | 7/2016 | Tempelton |
| 9,526,863 B2 | | 12/2016 | Nawasra |

(Continued)

OTHER PUBLICATIONS

Barry L. Stann, Low-cost compact ladar sensor for ground robots, Proceedings of SPIE, SPIE Digital Library vol. 7323, pp. 30X1 tp 30X-12, May 2009.

*Primary Examiner* — Mark Hellner
(74) *Attorney, Agent, or Firm* — Thomas O'Rourke; Bodner & O'Rourke, LLP

(57) ABSTRACT

A laser radar includes: a laser, an optical transmission system, a 1-dimensional array of photo-detectors, an optical reception system, and an electronic control system. The laser emits a wavelength of light, and the optical transmission system shapes the light into a beam, and scans the beam along a fan of transmission light paths toward a target. The photo-detectors are capable of time-of-arrival measurements and are sensitive to the wavelength of light. The optical reception system collects the laser light reflected from the target along a fan of reception light paths. The electronic control system synchronizes the scan of the beam with a respective time-of-arrival measurement from each of the photo-detectors, and analyzes the time-of-arrival measurements. The system is configured for all of the transmission light paths and all of the reception light paths to lie in one plane, with all of the reception light paths intersecting with at least one of the transmission light paths.

88 Claims, 13 Drawing Sheets

(56) References Cited

U.S. PATENT DOCUMENTS

| | | | |
|---|---|---|---|
| 2002/0140924 A1* | 10/2002 | Wangler | G01S 7/4802 356/28 |
| 2007/0035624 A1 | 2/2007 | Lubard | |
| 2010/0053715 A1 | 3/2010 | O'Neill | |
| 2012/1790029 | 7/2012 | Azzazy | |
| 2012/0236379 A1 | 9/2012 | da Silva | |
| 2013/0242283 A1 | 9/2013 | Bailey | |
| 2014/0168634 A1* | 6/2014 | Kameyama | B64G 1/64 356/5.01 |
| 2015/0301180 A1* | 10/2015 | Stettner | G01S 17/107 356/5.01 |

* cited by examiner

HYBRID LADAR WITH CO-PLANAR SCANNING AND IMAGING FIELD-OF-VIEW

CROSS-REFERENCE TO RELATED APPLICATIONS

This application claims priority on U.S. Provisional Application Ser. No. 62/295,210, filed on Feb. 15, 2016, the disclosures of which are incorporated herein by reference.

FIELD OF THE INVENTION

The present invention relates generally to the field of optical Time-of-Flight (ToF) measurement, and more specifically, to directionally-resolved ToF measurement technology, known as Laser Radar (LADAR).

BACKGROUND OF THE INVENTION

The need for early warning of an invading force dates back to the ancient world, which could involve scouts traveling on foot or by horse back, and eventually included use of telescopes and binoculars for an enhanced view of the enemy. In the modem era, beginning in World War II, radio detection and ranging (RADAR) systems were deployed, and which utilize reflected radio waves to identify the position of enemy aircraft. Sonar similarly uses sound waves to locate vessels within the oceans. Soon after the development of laser technologies, light/laser detection and ranging (LIDAR/LADAR) systems underwent development.

LADAR is generally based on emitting short pulses of light within certain Field-Of-View (FOV) at precisely-controlled moments, collecting the reflected light and determining its Time-of-Arrival, possibly, separately from different directions. Subtraction of the pulse emission time from ToA yields ToF, and that, in turns, allows one to determine the distance to the target the light was reflected from. LADAR is the most promising vision technology for autonomous vehicles of different kinds, as well as surveillance, security, industrial automation, and many other areas, where detailed information about the immediate surroundings is required. While lacking the range of radar, LADAR has a much higher resolution due to much shorter wavelengths that are used for sensing, and hence, comparatively relaxed diffractive limitations. It may be especially useful for moving vehicles, both manned, self-driving, and unmanned, if it could provide detailed 3D information in real-time, with the potential to revolutionize vehicles' sensing abilities and enable a variety of missions and applications.

However, until recently, LADARs have been prohibitively large and expensive for vehicular use. They were also lacking in desirable performance: to become a true real-time vision technology, LADAR must provide high-resolution imagery, at high frame rates, comparable with video cameras, in the range of 15-60 fps, and cover a substantial solid angle. Ideally, a LADAR with omnidirectional coverage of 360° azimuth and 180° elevation would be very beneficial. Collectively, these requirements may be called "real-time 3D vision".

A variety of approaches has been suggested and tried, including mechanical scanning, non-mechanical scanning, and imaging time-of-flight (ToF) focal-plane arrays (FPA). There is also a variety of laser types, detectors, signal processing techniques, etc. that have been used to date, as shown by the following.

U.S. Patent Application Pub. No. 2012/0170029 by Azzazy teaches 2D focal plane array (FPA) in the form of a micro-channel plate, illuminated in its entirety by a short power pulse of light. This arrangement is generally known as flash LADAR.

U.S. Patent Application Pub. No. 2012/0261516 by Gilliland teaches another embodiment of flash LADAR, with a two dimensional array of avalanche photodiodes illuminated in its entirety as well.

U.S. Patent Application Pub. No. 2007/0035624 by Lubard teaches a similar arrangement with a 1D array of detectors, still illuminated together, while U.S. Pat. No. 6,882,409 to Evans further adds sensitivity to different wavelengths to flash LADAR. Another approach is the use a 2D scanner and only one detector receiving reflected light sequentially from every point in the FOV, as taught by US Patent Application Pub. No. 201210236379 by da Silva.

Additional improvements to this approach are offered by U.S. Pat. No. 9,383,753 to Templeton, teaching a synchronous scan of the FOV of a single receiver via an array of synchronized MEMS mirrors. This arrangement is known as retro-reflective.

Yet another approach is to combine multiple lasers and multiple detectors in a single scanned FOV, as taught by U.S. Pat. No. 8,767,190 to Hall.

However, presently, such a real-time 3D LADAR remains elusive.

OBJECTS OF THE INVENTION

The present invention is aimed at overcoming the limitations of both scanning and imaging approaches to LADAR by combining their advantages and alleviating their problems, namely to:

1. Improve Signal-to-Noise Ratio (SNR);
2. Lower the peak power of illumination sources, reduce their cost and improve efficiency;
3. Reduce overall cost and power consumption; and
4. Increase the resolution.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the above-noted objects of this invention may be achieved by combining a relatively large 1D array of time-sensitive detectors (preferably, hundreds of pixels), with a relatively fast 1D laser scanner (preferably, tens of kHz in frequency), in a co-planar configuration, that allows collection of one line of ToF data during each scan. Optionally, the planar FOV of both the scanner and the detector is also scanned in an orthogonal direction at a slower rate, thus providing a 2D FOV.

BRIEF DESCRIPTION OF THE DRAWINGS

FIG. 6A illustrates the laser of the LADAR system being continuously ON.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B. and C", and "A, B, and/or C" mean all of the following possible combinations: A alone; or B alone; or C alone; or A and B together; or A and C together: or B and C together; or A, B and C together.

The word "pixel" is used throughout this specification to denote an individual detector of a 1D detector array.

Also, all references (e.g., patents, published patent applications, and non-patent literature) that are cited within this document are incorporated herein in their entirety by reference.

Furthermore, the described features, advantages, and characteristics of any particular embodiment disclosed herein, may be combined in any suitable manner with any of the other embodiments disclosed herein.

In accordance with at least one embodiment of the hybrid LADAR system disclosed herein, a fast 1D scanner/imager hybrid can collect one line of high-resolution ToF data within tens of microseconds. If needed, that hybrid can also be coupled to a secondary, slow scanning stage, producing raster ToF frames of thousands of lines at high frame rates, with total pixel throughput of tens or even hundreds of megapixels per second.

The following description lists several embodiments of the present invention, which are merely exemplary of many variations and permutations of the subject matter disclosed.

Mention of one or more representative features of a given embodiment is likewise exemplary: an embodiment can exist with or without a given feature, and likewise, a given feature can be part of other embodiments.

Figure 1:
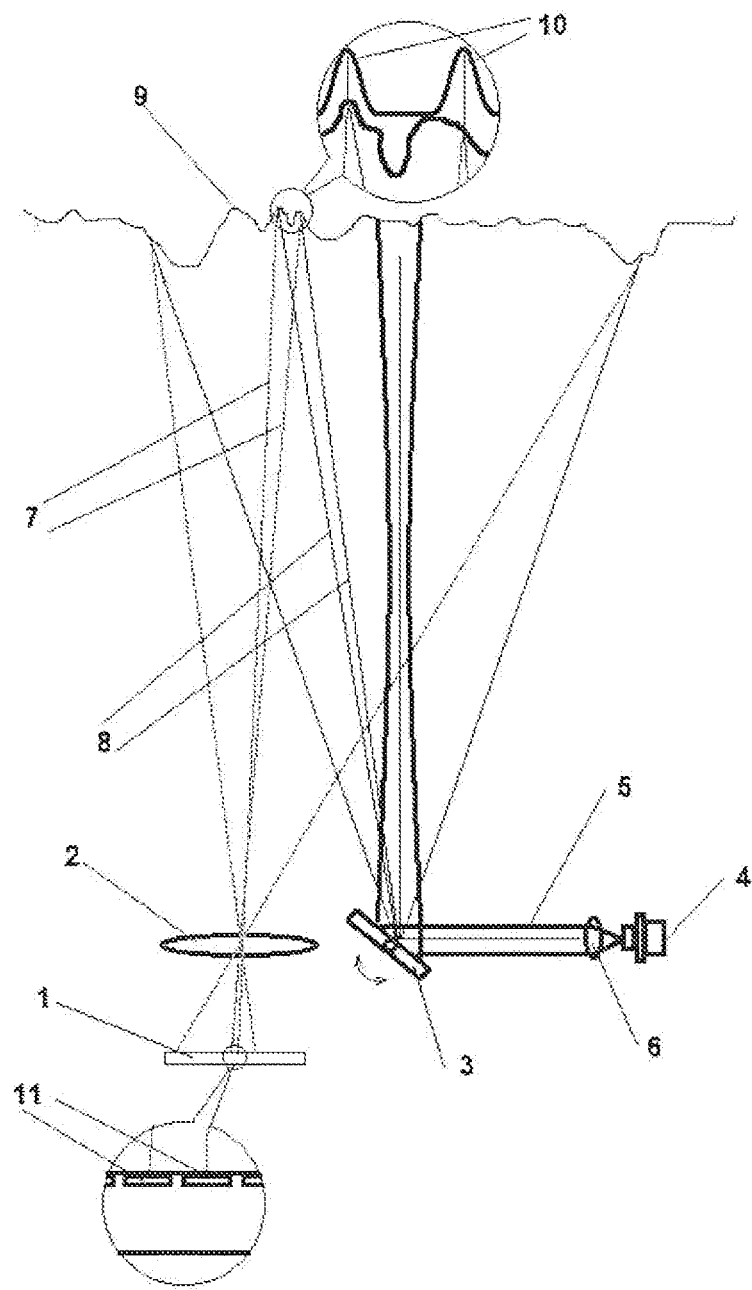
FIG. 1 illustrates a concept for a 1D scanning and imaging hybrid system.

A preferable embodiment of a 1D hybrid scanner/imager is illustrated in FIG. 1. It comprises a 1D array of photo-detectors 1, placed in a focal point of a receiving optical system 2, and a scanning mirror 3, its axis of rotation perpendicular to the direction of the detector array. A laser beam 5 generated by the laser 4 is directed onto the scanning mirror 3 through a collimating lens 6. The positions of the optical system 2 and the scanner 3 are adjusted in such way that the fan of imaginary rays 7 emanating from individual pixels of the array, and the fan of real laser rays 8 emanating from the scanning mirror 3 lay in the same plane. Respectively, the laser scan line on the target overlaps with the FOV of the detector array.

Preferably, the scanning mirror 3 is a resonant MEMS mirror. Such mirrors, having dimensions of the reflective area of the order of 1 sq. mm, the resonant frequencies of tens of kHz, and the scan amplitude of tens of degrees, are becoming commercially available. While generally this invention would benefit from the fastest rate of scanning, a general tendency in scanning mirrors is that the faster scanning rate typically leads to narrower scan angle and smaller mirror size, which in turn increases the divergence of the scanned laser beam, thus limiting the number and size of the detectors in the array, and the amount of light that can be collected onto the detectors, especially, at longer ranges.

This invention might further benefit from non-mechanical beam scanners (NMBS), that are undergoing development, although their specifications and commercial availability remain unclear. For example, U.S. Pat. No. 8,829,417 to Krill teaches a phase array scanner, and U.S. Pat. No. 9,366,938 to Anderson teaches an electro-optic beam deflector device. NMBS may allow scan rates, or beam cross-sections, exceeding those of mechanical scanners.

A photo-detector array should preferably consist of high-sensitivity detectors, as the number of photons arriving to each detector, especially from longer ranges, might be exceedingly small. Significant progress has been recently achieved in design and manufacturing of Avalanche Photo Diodes (APD), working in both a linear, and a Geiger mode, which is also known as a Single-Photon Avalanche Detector (SPAD). The former are reported to be able to detect a light pulse consisting of just a few photons, while the latter can actually be triggered by a single photon, and both types would be suitable for embodiments of the present invention. It should be noted, however, that the most advanced detectors are expensive to fabricate, therefore, the present invention that needs only one row of detectors would be very cost-efficient in comparison with flash LADAR, that would typically require a 2D array of the same resolution.

One of the problems typically encountered in ground-based and vehicular LADARs intended to be used in a populated area is the eye safety hazard presented by its powerful lasers. Therefore, a preferable embodiment of this invention would use a laser with longer infra-red (IR) wavelength, exceeding approximately 1400 nm. Such longer wavelengths are not well-absorbed by human eyes and therefore don't pose much danger. Respectively, much more powerful lasers might be used in this spectral range.

Figure 2A:
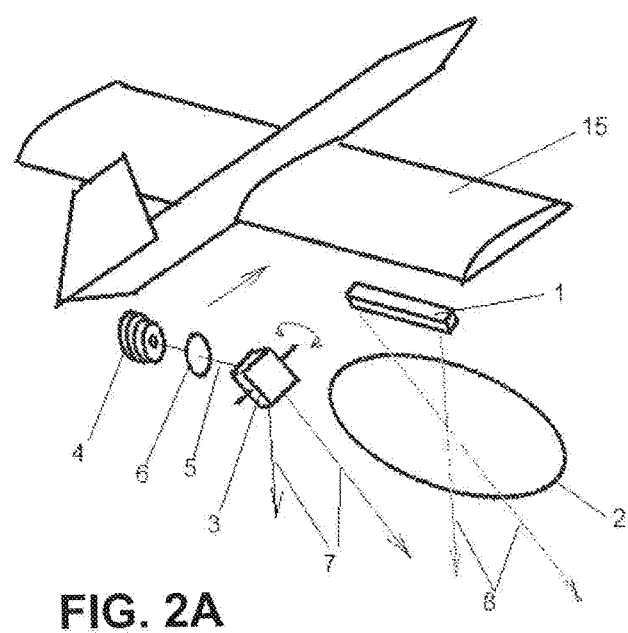
FIG. 2A illustrates a 1D hybrid LADAR installed on a Unmanned Aerial Vehicle (UAV) to obtain 2D ToF data.

Depending on a particular task the hybrid LADAR is optimized for, one of the following configurations of the slow stage may be used for ground surveillance, or alternatively there may not be any slow stage at all. As depicted on FIG. 2A, the hybrid 1D LADAR of FIG. 1 is attached to an aerial platform 15, with the scan direction perpendicular to direction of platform motion.

Figure 2C:
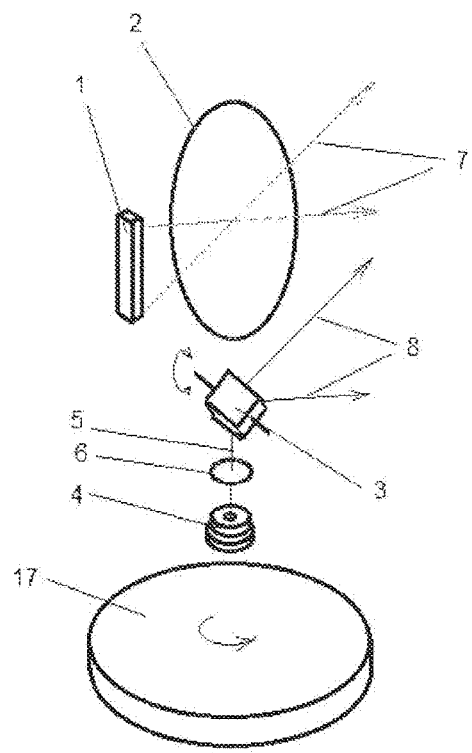
FIG. 2C illustrates a 1D hybrid LADAR installed on a rotating platform to obtain 2D ToF data.
Figure 2B:
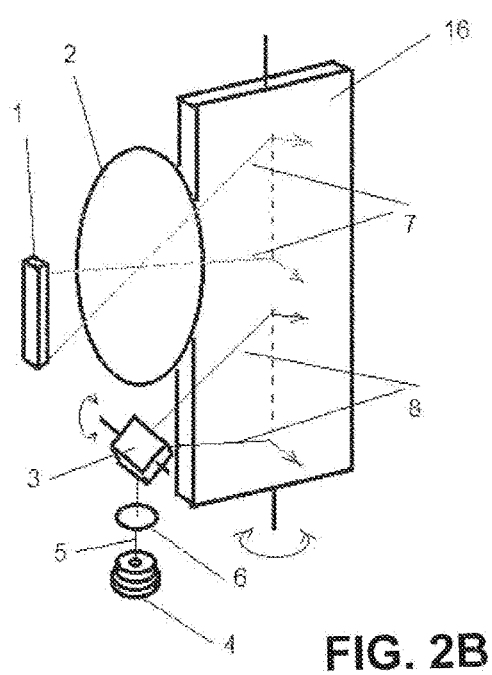
FIG. 2B illustrates a 1D hybrid LADAR coupled to an additional scanning mirror to obtain 2D ToF data.

FIG. 2B illustrates using a scanning mirror 16, with its scanning direction being perpendicular to the scanning direction of the hybrid. Combined, they constitute a 2D LADAR preferably having comparable scan angles in both directions. Finally, FIG. 2C illustrates positioning the hybrid of FIG. 1 on a rotational stage 17, which gives the combined LADAR a 360 degree FOV in a horizontal plane.

If a scanning mirror is used for the slow stage, its area should be sufficiently large to reflect the entire fan of beams emanating from the fast scanner, as well as the entire fan of rays coming to the optical reception system. However, scanning mirrors with active area of square centimeters, frequencies of tens of Hz. and scan angles of tens of degrees are commercially available. Thus, an exemplary combination of a detector array with 300 pixels, a fast scanner of 30 kHz, and a slow scanner of 30 Hz would provide a point cloud of ~18M points a second, assuming that both scanners utilize both scan directions, thus enabling real-time 3D vision with the resolution of approximately 1000×300 pixels at 60 frames a second. Rotation at 60 revolutions per second, or linear motion on board a vehicle would also provide comparable point acquisition rates, without the limitations of the reflective area of the scanning mirror.

Preferably, the optical system 2 is configured to form the FOV of each individual pixel 11 of the detector array to match the divergence angle of the laser beam, which is generally possible and usually not difficult to achieve. In an exemplary embodiment, a laser beam of near-infrared (NIR) light of approximately 1 mm in diameter will have a far-field divergence of approximately 1 milliradian (mrad). A photo-detector pixel 20 um in size will have similar FOV when placed in a focal plane of a lens with 20 mm focal length.

Figure 3A:
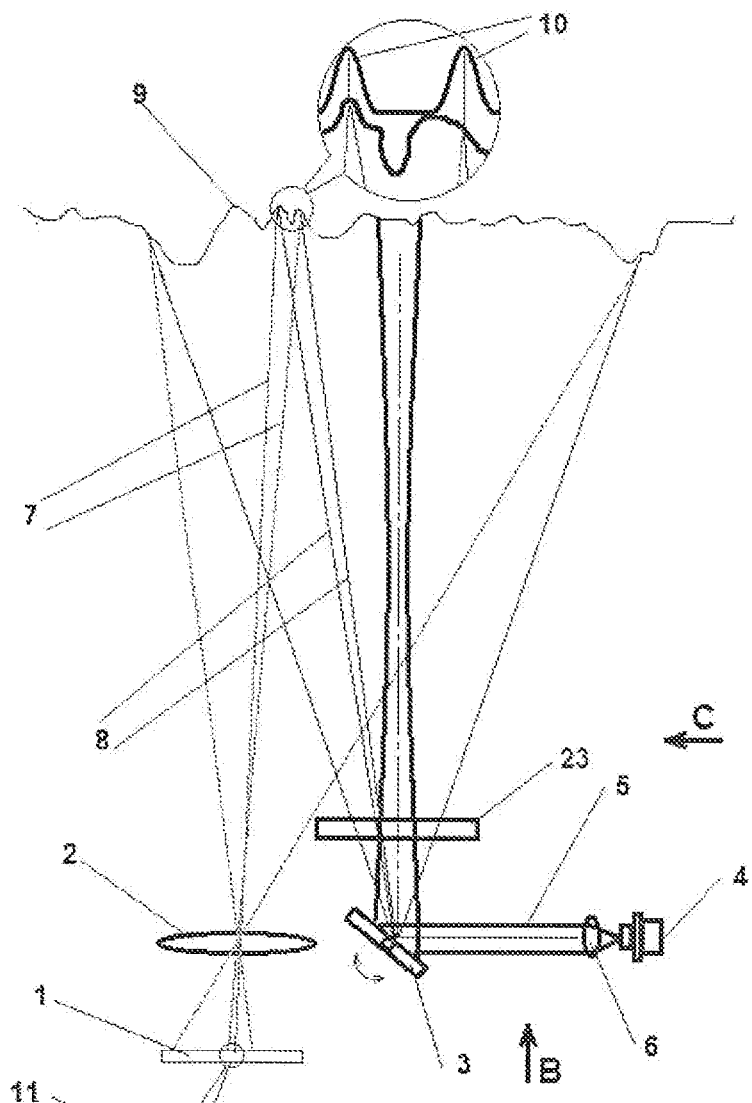
FIG. 3A illustrates tight focusing of the laser beam on the scanning mirror of a LADAR and subsequent re-collimation with a cylindrical lens.
Figure 3C:
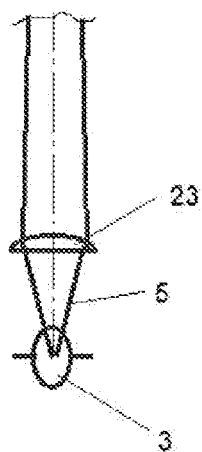
FIG. 3C is a side view of the LADAR of FIG. 3A.
Figure 3B:
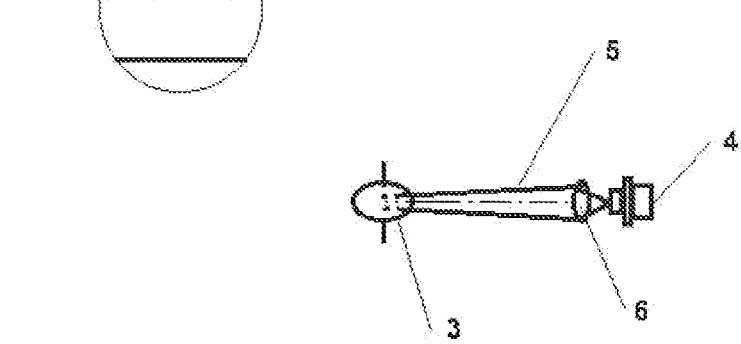
FIG. 3B is a bottom view of the LADAR of FIG. 3A.

It might also be advantageous to use additional elements in an optical transmission system to shape the laser beam, such as, for example, a cylindrical lens 23, as depicted in FIG. 3A. In this case, the laser may still be nearly-collimated in the scanning direction, but may be tightly focused in the orthogonal direction, as illustrated by FIG. 3B, which shows the view from direction B in FIG. 3A. Cylindrical lens 23 subsequently re-collimates the beam in the orthogonal direction as illustrated on FIG. 3C, which shows the view from direction C in FIG. 3A. The advantage of such an arrangement lies in the possibility to reduce the dimension of the scanning mirror in the tightly-focused laser beam direction, as well as in reduced eye hazard presented by the laser beam expanded in at least one direction.

Figure 4:
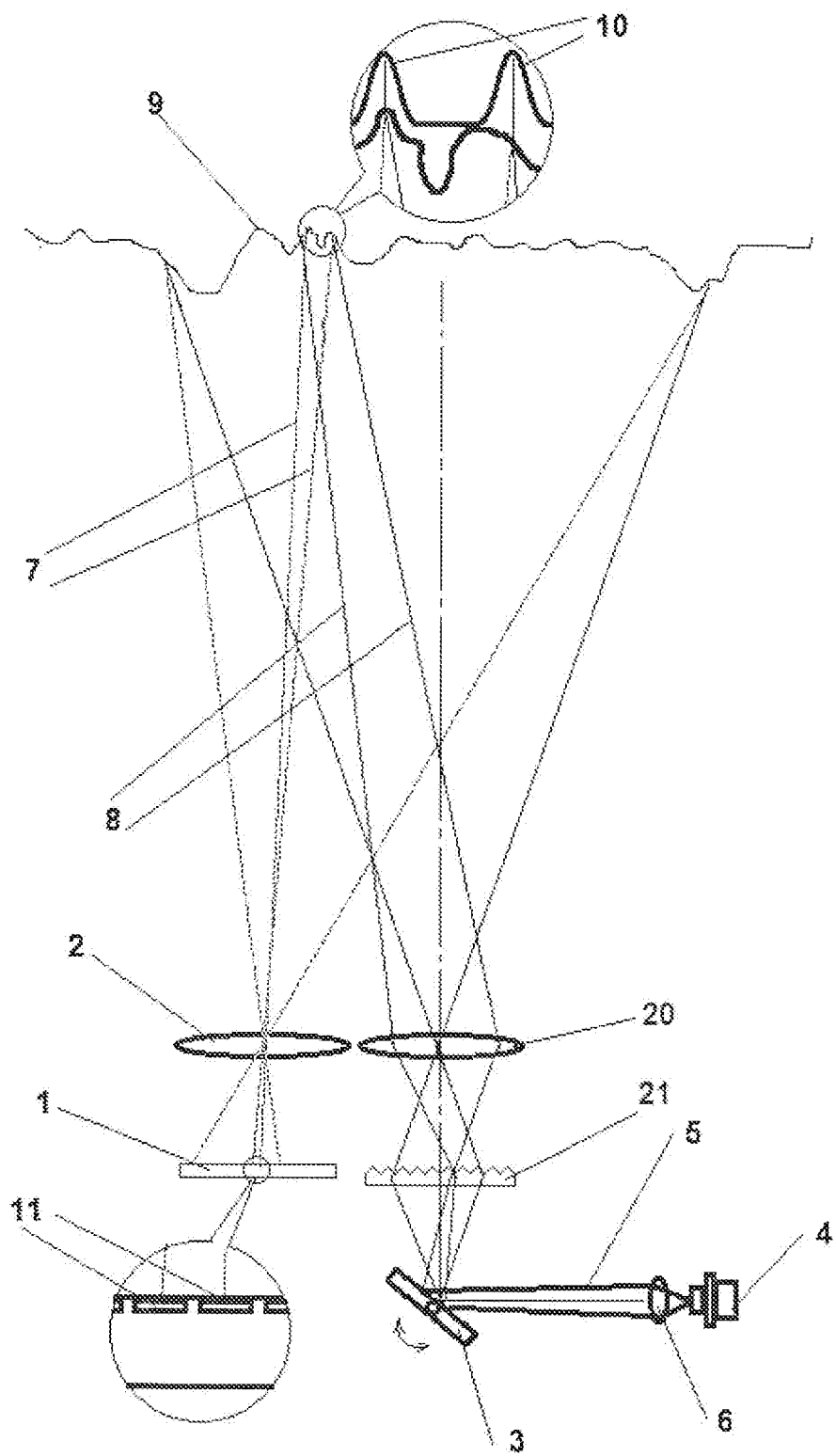
FIG. 4 illustrates forming a scan line on the surface of a diffractive element and imaging the scan line onto the target.
Figure 5A:
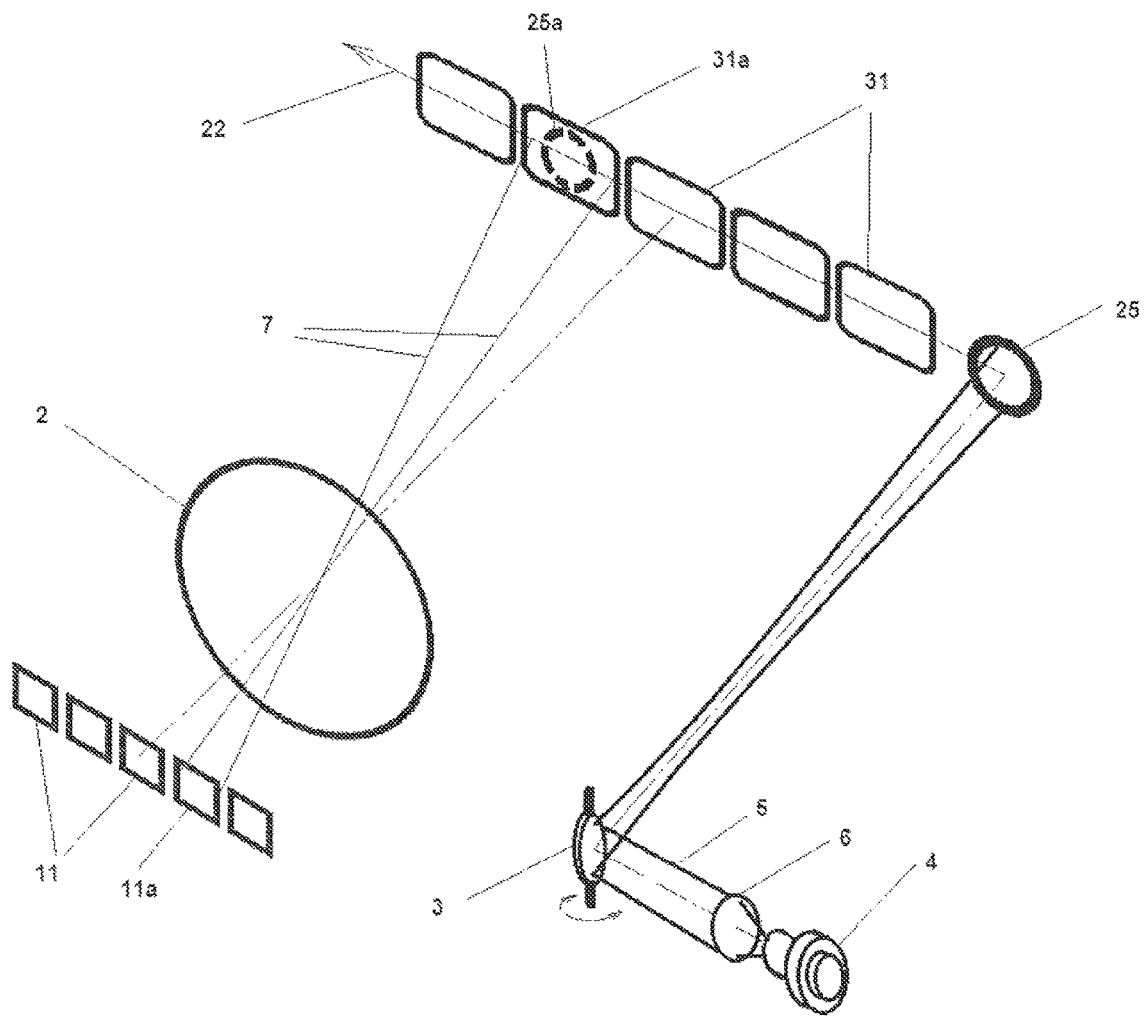
FIG. 5A illustrates a laser spot scanning across virtual detector pixels on the target.

In another embodiment of the present invention, the laser beam can be tightly focused in both directions and be scanned across a diffractive element 21, as illustrated on FIG. 4, forming a thin scan line on its surface. That scan line is subsequently imaged onto the target by the lens 20. The lens 20 may be identical to the lens 2 in the optical reception system in front of the detector array, in which case the dimensions of the scan line on the surface of a diffractive element 21 should be similar to that of the detector array, thus insuring the equal divergence of both FOVs of the illuminating laser and the detector. Alternatively, the lenses 2 and 20 may have different magnification, and respectively, the scan line may have different dimensions from the detector array, however, the design should provide for a good overlap of both FOVs on the target, as further illustrated on FIG. 5A, where virtual pixels 31 denote the projections of the detector pixels 11 onto the target through the optical system 2, while the laser spot 25 scans the same target along the scan line 22, thus sequentially illuminating pixels 11 with light reflected from the target. As shown on the figure for clarity, at the moment when the laser spot assumes position 25a, it illuminates the detector pixel 11a. It should be noted that the desired shape of laser spot 25 may be achieved by a variety of optical methods, as illustrated on FIG. 3 and FIG. 4, or other methods, without limiting the scope of this invention.

Figure 5B:
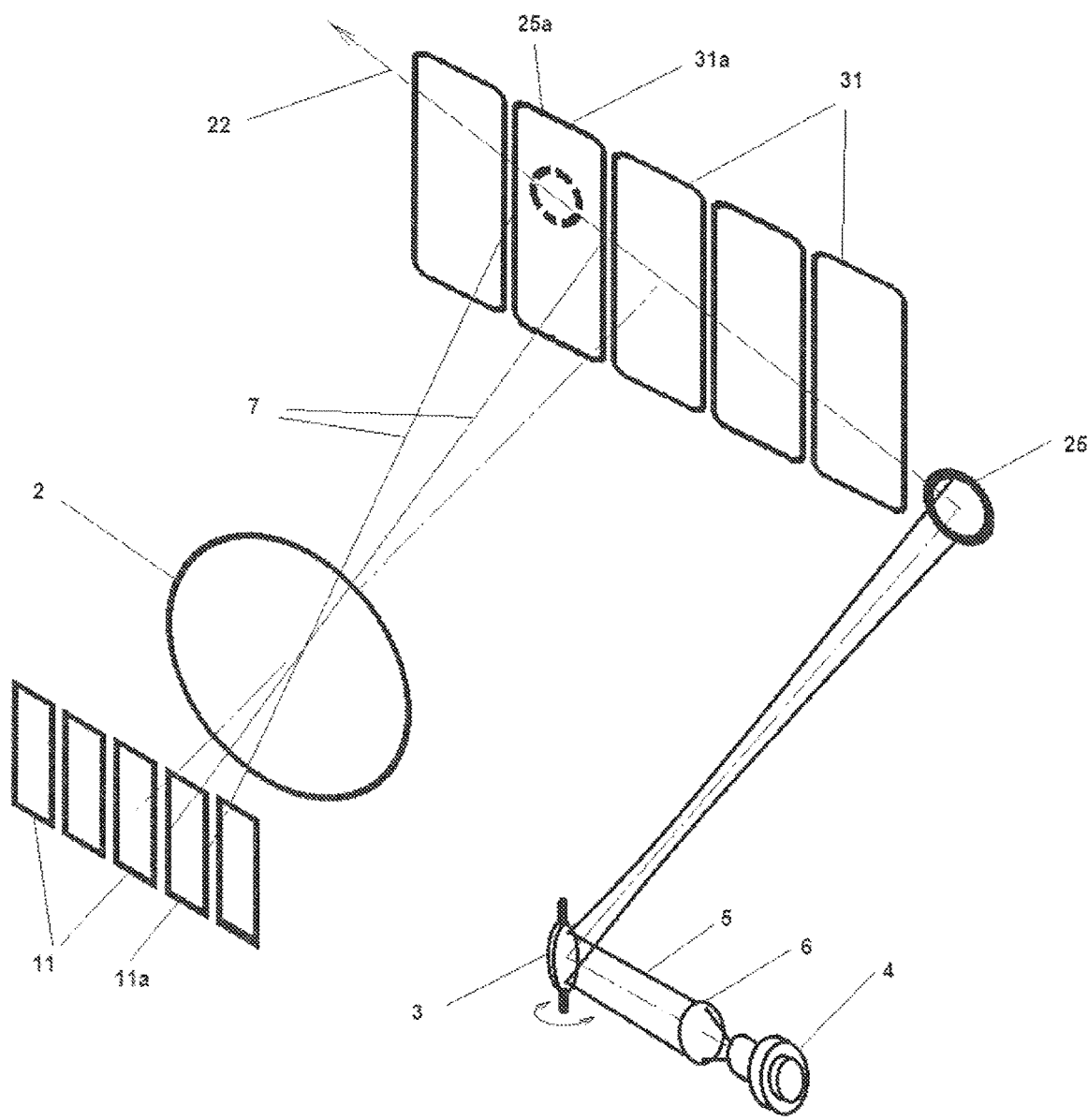
FIG. 5B illustrates permissible misalignment while the laser spot is scanning across tall virtual detector pixels on the target.
Figure 5C:
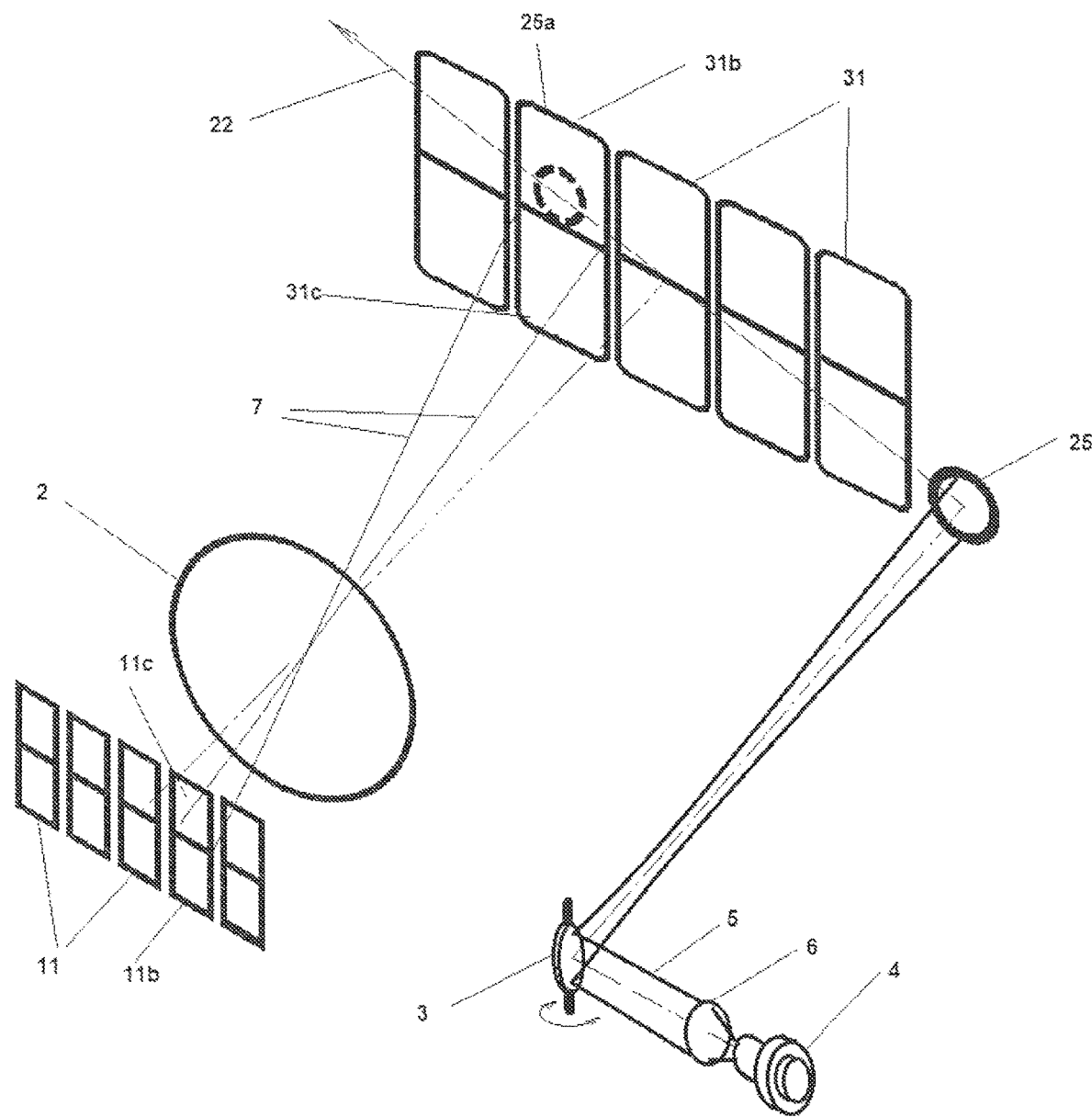
FIG. 5C illustrates splitting each of the pixels shown in FIG. 5B into two sub-pixels.
Figure 5D:
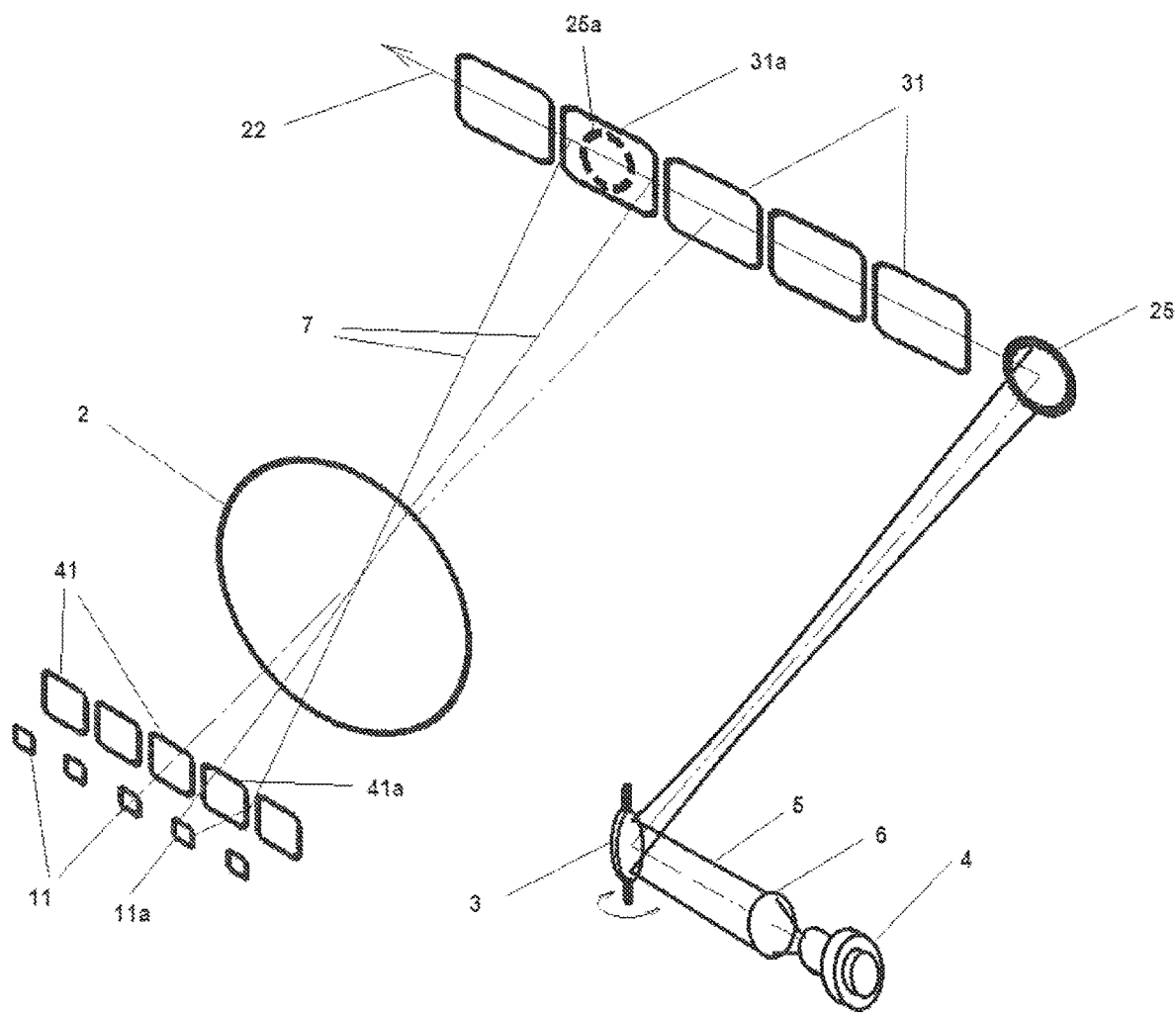
FIG. 5D illustrates positioning an array of micro-lenses in front of the detectors, and further illustrates how a relatively small pixel can be collecting light from a relatively large virtual pixel.

Pixels 11 may have different shapes: for example, FIG. 5B illustrates pixels with their height exceeding the pitch of the array. For example, pixels of the array may be 20 micrometers wide and 60 micrometers toll. The advantage of such arrangement is that it may accommodate slight misalignment between the laser scan line 22 and the line of virtual pixels 31. Likewise, the laser spot may also be oblong, or have some other desirable shape. It might also be advantageous to split each of the pixels 11 into two or more sub-pixels 11b, 11c, as depicted on FIG. 5C. These sub-pixels would generate redundant information, as the scan spot 25 may cross either of virtual pixels 31b, or 31c, or both of them, at the same time, and the ToA measured by either sub-pixels or both would be treated as one data point. The advantage, however, may come from the fact that smaller sub-pixels would generally have lower noise level, therefore a laser spot of the same power is more likely to generate a response when illuminating a small sub-pixel, than a larger full pixel.

Some types of the high-sensitivity detectors, notably Geiger-mode APDs, are known to need considerable gaps between active pixels to eliminate cross-talk, thus limiting the fill factor of the arrays consisting of such detectors. To alleviate this problem, an array of micro-lenses 12 may be used in front of the detectors 11, as depicted on FIG. 5I, with the micro-lens 12a specifically illustrating how a relatively small pixel 11a can still be collecting light from a relatively large virtual pixel 31a.

It is also preferable to match the total extent of the array's FOV with the total scan angle, for example: 512 pixels, 20 um each, placed behind a 20-mm lens will subtend the angle of ~29°. Respectively, the total scan angle should be the same or slightly greater to utilize every pixel of the array.

Figure 6A:
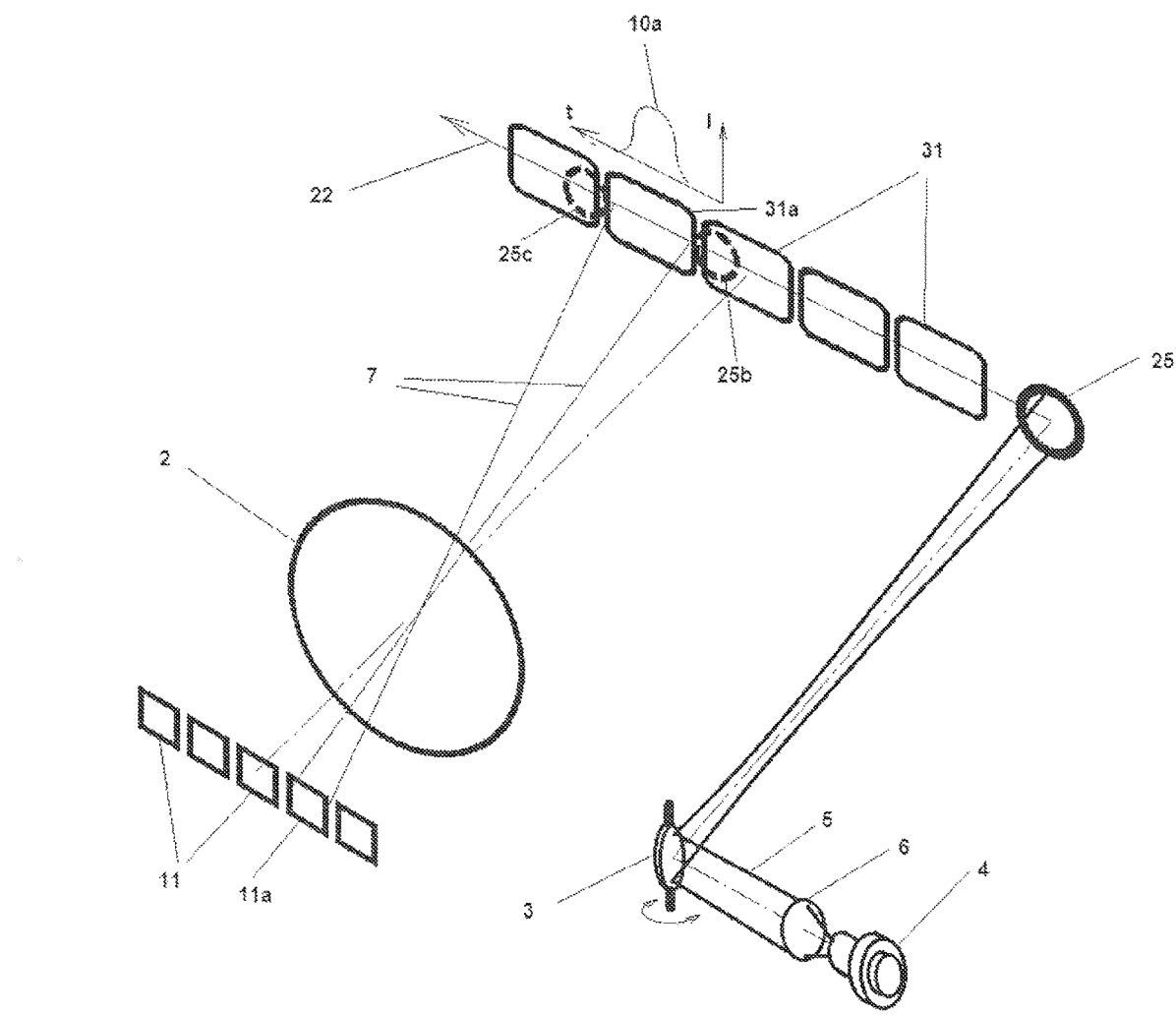

In a further embodiment of this invention, as the laser spot moves along the scan line, it is continuously energized, thus producing a time-domain response in the pixels it crosses, as illustrated on FIG. 6A, where the graph 10A represents the intensity (I) vs. time (t) response in the pixel 11a. The response starts when the laser beam in position 25b just touches the virtual pixel 31a, and ends when the laser beam moves to position 25c, just outside of the virtual pixel 31a. In such an embodiment, the laser power, and hence, the sensitivity is maximized, however, the precision of ToF measurement may suffer, due to the ambiguity of the Time of Arrival (ToA) of a relatively long light pulse.

Figure 6B:
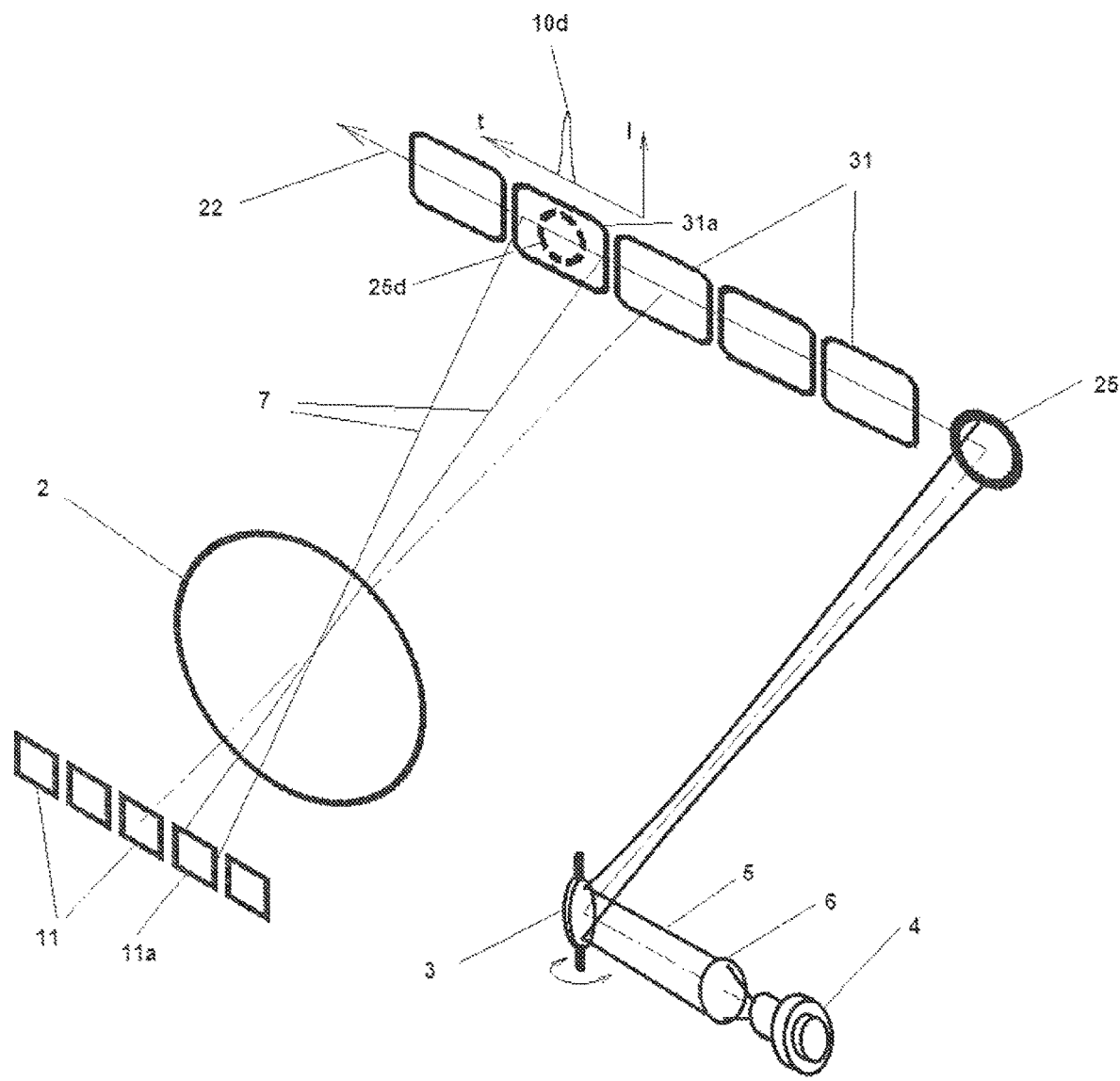
FIG. 6B illustrates the laser being modulated with one short pulse per pixel.
Figure 6C:
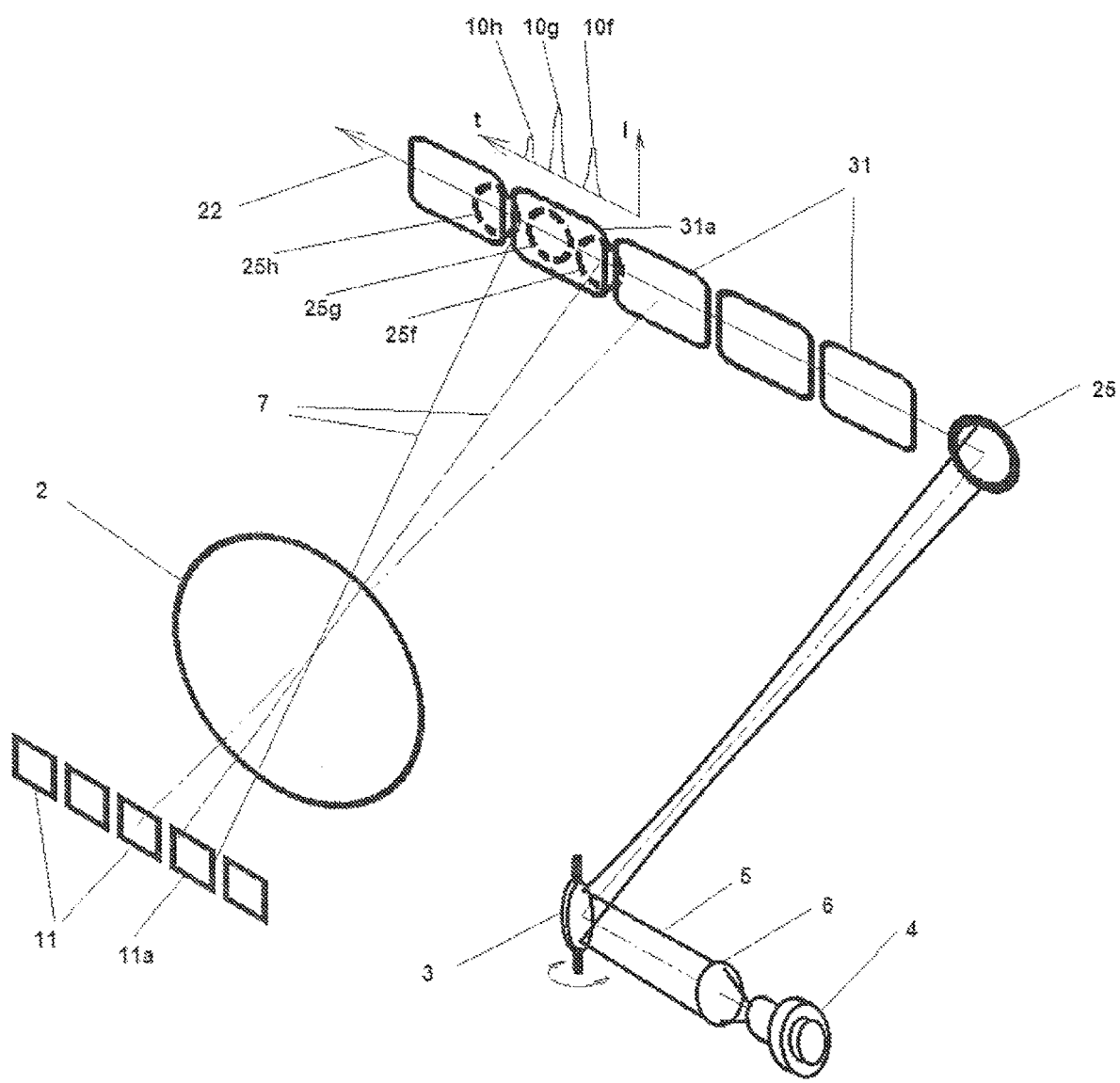
FIG. 6C illustrates the laser being modulated with multiple short pulses per pixel.

To alleviate this problem, the laser can be electrically-modulated with shorter pulses, as illustrated by FIG. 6B. For example, the laser is turned on when the laser spot is in the position 26d, producing the response 10d in the pixel 11a. Since the pulse is narrower, its ToA can be determined with greater precision.

One problem with this modulation method might arise if the laser is energized while its spot falls in between two virtual pixels, therefore each of the real pixels are getting only a fraction of the reflected light. Due to some parallax between the laser scanner and the detector array, the precise overlap between the laser spot and virtual pixels is somewhat dependent on the distance to the target, and hence not entirely predictable. To alleviate this problem, the laser may be modulated with more than one pulse per pixel, as illustrated on FIG. 6B. In this case, at least one of the consecutive modulation pulses emitted with the laser spot in positions 25f, 25g, 25h, would fully overlap with the virtual pixel 31a, thus producing full response 10g in the pixel 11a. Responses from two other pulses 10f and 10h might be shared with adjacent pixels and hence be lower.

Figure 7:
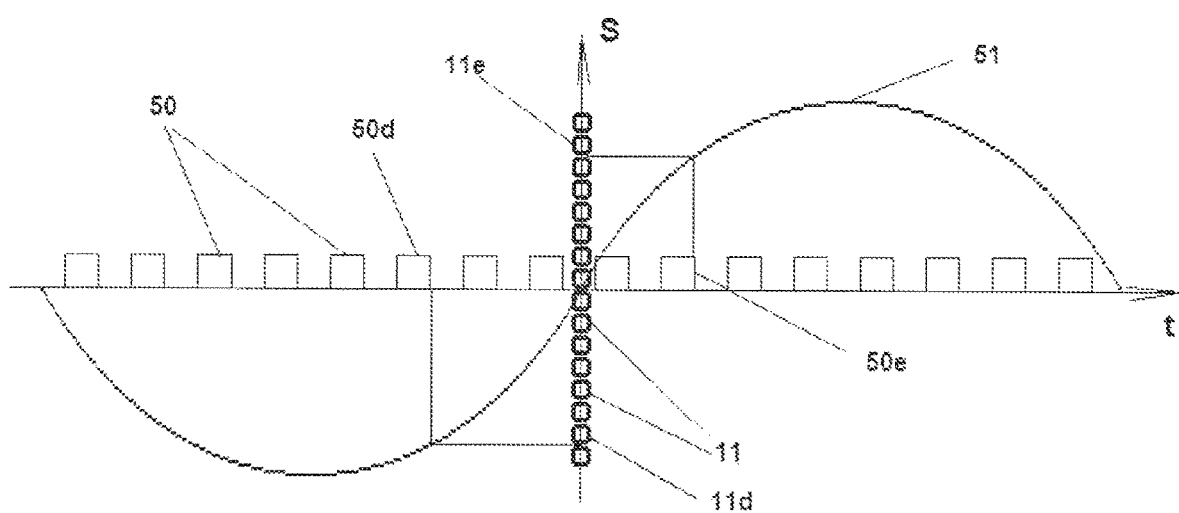
FIG. 7 illustrates synchronizing the clock of an electronic control system with the scanning process, so that there is a constant integer number of clock pulses per scanning cycle.

In any LIDAR system dependent on ToF measurements, it is important to accurately measure the ToA of a light pulse on the detector, as well as the time when the light pulse was emitted. In the present invention, additionally, it is important to precisely know the position of the scanned spot, as it determines which detector pixel will be illuminated. To achieve this, it is preferable to synchronize the clock of the electronic control system, denoted by pulses 50 on FIG. 7, with the scanning process, in such a way that there is a constant integer number of clock pulses per scanning cycle 51. The vertical axis (S) on FIG. 7 illustrates a scan angle, while the horizontal axis (t) illustrates time. Since many resonant scanners have unique, non-tunable resonant frequency, the system clock frequency may be changed instead to keep a integer number of clocks per period, preferably, by means of a Phase-Lock Loop (PLL) circuit. As long as this fixed relationship between the system clock and the scan angle is maintained, the system clock may be easily used for precise detector read-out timing, as well as for timing of the laser modulation pulses, if such modulation is used. Additionally, some types of detectors require quenching after they received a light pulse, and arming, to be able to receive the next pulse. Keeping pixels armed when they are not expected to be illuminated is undesirable, as it carries the risk of false positive due to internal noise. In most flash LADARs with such detectors, they are armed all at once, right before the illuminating laser pulse is emitted. In the present invention, it is preferable to arm detectors one-by-one, in the order they are illuminated by the scanning laser beam. As illustrated on FIG. 7, while the scanning beam proceeds from bottom to top, the pixel 11d would be armed by the system clock pulse 50d, while pixel 11e will be armed considerably later by the system clock pulse 50e.

Figure 8:
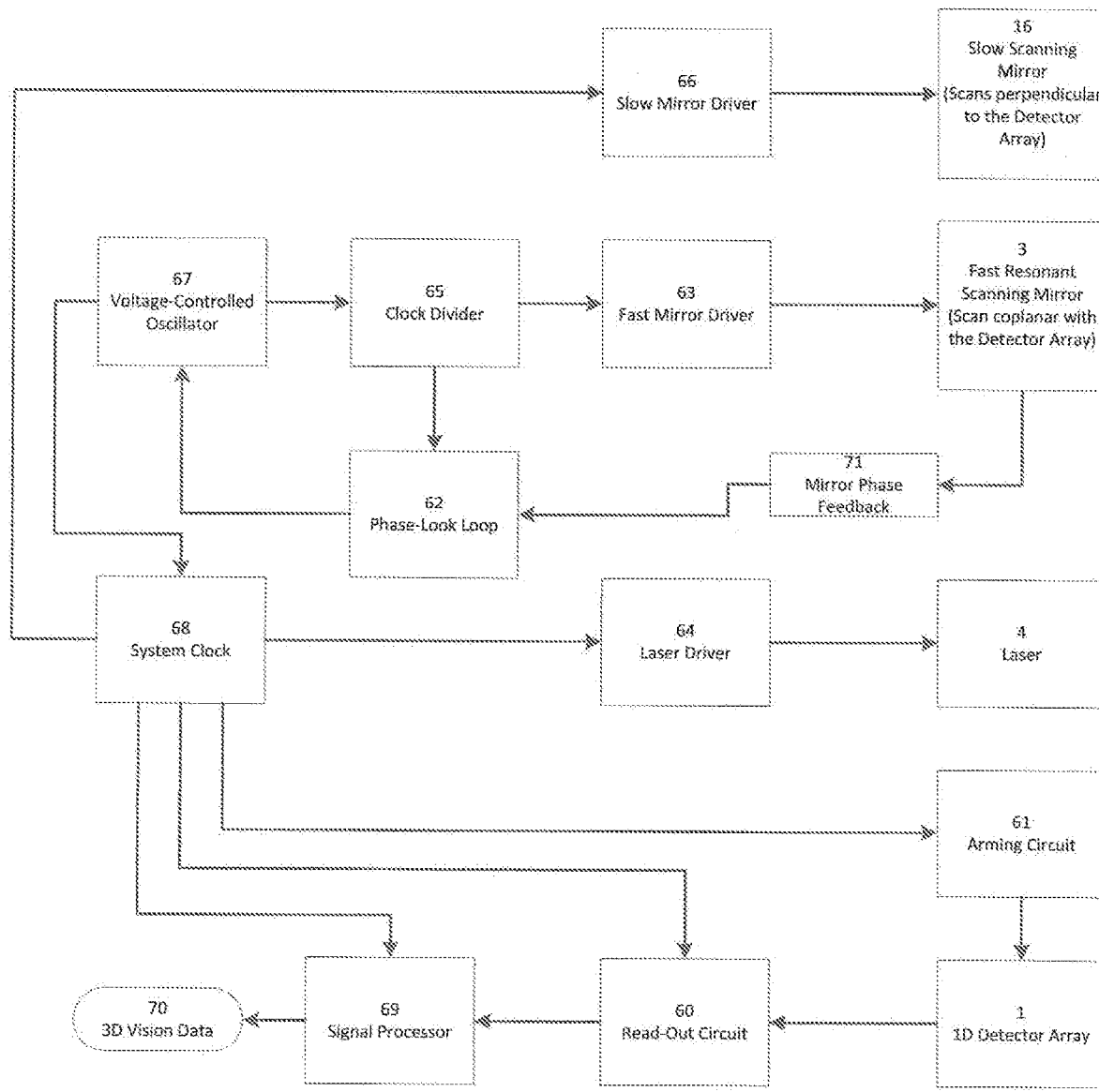
FIG. 8 illustrates the electronic control system of FIG. 7.

A preferred embodiment of the electronic control system is illustrated by FIG. 8. The fast scanning mirror 3 is driven by the driver 63 at the frequency defined by the voltage-controlled oscillator (VCO) 67 through clock divider 65. Being resonant, mirror 3 tends to oscillate at maximum amplitude while driven at its own resonant frequency and in a specific phase with respect to the drive signal. The mirror phase feedback 71 carries the information about the mirror's phase to the phase-locked loop (PLL) 62, that compares it to the phase of the clock divider and adjusts the VCO to eliminate any phase error, thus maintaining mirror oscillations close to its resonant frequency.

System clock 68 is derived from the same VCO, thus insuring that all other timing blocks function in strict synchronization with the mirror motion. Specifically, the arming circuit 61 provides sequential pixel arming and the laser driver 64 generate laser pulses in specific relationship to the scanned laser spot, as discussed above. Likewise, the same system clock synchronizes the motion of the slow mirror 16 through the driver 66 in a fixed relationship with the motion of the fast mirror, for instance, one cycle of the slow mirror per 1024 cycles of the fast mirror. Read-out circuit 60 and signal processor 69 may use the same clock as well, although they, unlike other elements discussed above, don't have to be strictly synchronized with the mirror motion.

They must, however, be fast enough to be able to read and process data from all pixels within one scan cycle of the fast mirror. 3D vision data 70 is generated based on the ToF measurement coming from the detector array 1 and then supplied to users, such as navigation system of autonomous vehicles or security surveillance system.

It should be noted that the present invention offers a considerable advantage in efficiency over other types of LADARs, especially flash LADARs, where short laser pulses are used to illuminate the entire scene at relatively long intervals. The advantage comes from the fact that in the present invention the laser is energized either continuously, or with a fairly high duty cycle: for example, a LADAR of the present invention using 10 ns pulses per pixel and generating 18M data points per second would have a duty cycle of approximately 35%. A flash LADAR using the same 10 ns pulses, and having the same frame rate of 60 fps, would have the laser duty cycle of only 0.00006%. Consequently, to generate the same average power and attain comparable range, the laser of that hypothetical flash LADAR would need instantaneous power almost 6 orders of magnitude greater. While pulsed lasers capable of producing very short powerful pulses do exist, they are known to have lower efficiency, larger size and higher cost than continuous lasers of the same average power. Aside from inability to deliver high average power, pulsed sources are typically less efficient, more complex, bulkier and costlier, than continuous or high-duty sources. The general physical explanation of lower efficiency is in the fact that the emitted power of photonic sources—lasers or LEDs—is typically proportional to the current, while parasitic losses on various ohmic resistances inside those sources are proportional to the square of the current.

Additionally, high-power pulsed laser sources are typically more dangerous in terms of eye safety.

It should be noted, that it is difficult (although not impossible) to place the scanner at the center of the optical system. At any other position, there will be some parallax between the FOVs of the optical transmission and the reception systems, hence the detailed mapping of the pixels onto a scan line will depend on the distance to the target. However, in a practical system such parallax can be kept to a minimum by placing the scanner in close proximity to the optical system.

The present invention as illustrated by the above-discussed embodiments, would provide serious advantages over other types of LADAR.

In a typical imaging LADAR, the light source emits a short pulse which illuminates all pixels at once. Respectively, each pixel receives only a small fraction of the total back-scattered signal. In the proposed hybrid, only one pixel receives all the back-scattered light emitted at a given moment. If we assumed that the illumination power is the same, then the signal strength on each pixel would be up by a factor comparable to the number of pixels, i.e. hundreds, if not thousands. In practice, pulsed sources generally have higher instantaneous power than continuous ones, but their average power is still considerably lower.

Conversely, in a typical scanning LADAR, at any given moment only a small portion of the photo-detector is receiving any signal, while the rest only generates noise and contributes to unwanted capacitance. The exception is so-called retro-reflective scanners, where a small detector FOV is directed through the same scanning system. However, this approach only works with large, slow scanners, where the mirrors are large enough to provide sufficient optical collection area for back-scattered light. Contrarily, high-speed scanners are usually tiny, just sufficient to fit the beam of the laser, and are usually of the order of 1 mm.

In either case, as illustrated above, a hybrid appears would have a considerable SNR advantage: higher signal than imaging-only, or lower noise than scanning-only device.

It is anticipated that a hybrid LADAR of the present invention will be able to use a regular laser diode as its illumination source—which is by far the cheapest and most efficient source among those suitable for LADARs.

Also, both cost and power consumption are roughly proportional to the total number of pixels fabricated by a given technology. So, substituting a 2D array by a 1D array is supposed to considerably reduce both cost and power consumption for the detector array, while the cost and power consumption of both fast and slow scan stages may be considerably lower, than that of the array of pixels or the illuminating laser.

I claim:

1. A laser radar (LADAR) comprising:
   a laser configured to emit a wavelength of light;
   an optical transmission system configured to shape the light emitted by said laser into a beam, and to scan said beam along a fan of transmission light paths toward a target;
   a 1-dimensional array of photo-detectors, capable of time-of-arrival measurements and sensitive to said wavelength of light emitted by said laser;
   an optical reception system configured to collect said laser light reflected from the target onto said photo-detectors of said array along a fan of reception light paths;
   an electronic control system configured to synchronize said scan of said beam with a respective time-of-arrival measurement from each said photo-detector, and to analyze said time-of-arrival measurements;
   wherein all of said transmission light paths and all of said reception light paths lie in one plane;
   wherein every said reception light path intersects with at least one of said transmission light paths;
   where the laser is pulsed at least once while the transmission path of said scan of said beam intersects the reception paths from each detector in the array;
   where each pulse of said laser is timed to coincide with a center of the laser beam being coincident with a center of a field of view (FOV) of one of said photo-detectors; and
   where said timed laser pulses are automatically adjusted based on said analyzed time-of-arrival measurements from the array of photo-detectors.

2. The LADAR of claim 1, where an angle of a field of view (FOV) of each of said photo-detectors in the array in the direction of the array is the same as a divergence angle of said planar fan of transmission light paths in the same direction.

3. The LADAR of claim 1, where an angle of a field of view (FOV) of each of said photo-detectors in the array in a direction perpendicular to the direction of the array is the same as a divergence angle of said planar fan of transmission light paths in the same direction.

4. The LADAR of claim 1 where an angle of a field of view (FOV) of each of said photo-detectors in the direction of the array is the same as a total scan angle of said transmission system.

5. The LADAR of claim 1, where the laser is continuously on while the transmission path of said scan of said beam intersects the reception paths from all the detectors in the array.

6. The LADAR of claim 1, wherein said LADAR is placed on an aerial platform moving in the direction perpendicular to said plane containing the light paths of said transmission system.

7. The LADAR of claim 1, with a scanning mirror positioned in an optical path of the scanned laser beam, with an axis of rotation parallel to said plane containing the light paths of said transmission system.

8. The LADAR of claim 1 mounted on a rotational stage with an axis of rotation being parallel to said plane containing the light paths of said transmission system.

9. The LADAR of claim 1 where the photodetectors are Avalanche Photo Diodes (APD).

10. The LADAR of claim 9 where the photodetectors are Geiger-mode Avalanche Photo Diodes (APD).

11. The LADAR of claim 1 where the photodetectors are equipped with individual time counters configured to record a time of arrival of a first photon after a reset.

12. The LADAR of claim 1 where the photodetectors are equipped with multiple time counters configured to record a time of the arrival of multiple light pulses reflected from multiple objects on the path of the laser beam.

13. The LADAR of claim 1 wherein said transmission optical system comprises a mirror configured to produce said scan of said laser beam; and where the mirror is a mechanical resonant mirror.

14. The LADAR of claim 13 further comprising a system clock; and where a frequency of said system clock is an integer multiple of a frequency of said scan of said mirror.

15. The LADAR of claim 14 where the system clock is phase-locked to oscillations of said mechanical resonant mirror.

16. The LADAR of claim 1 where said optical transmission system comprises a non-mechanical beam scanner (NMBS) configured for said scan of said laser beam.

17. The LADAR of claim 1 where said optical transmission system is configured to form a scan line on a surface of a diffractive element, and for said scan line to be imaged onto the target through an optical element.

18. The LADAR of claim 1 wherein said optical system comprises a mirror configured to produce said scan of said laser beam; and where said optical system is configured for the laser beam to be focused on the mirror in a direction parallel to a scan axis of the mirror, and to then be re-collimated by a cylindrical lens.

19. The LADAR of claim 1 where a height of each pixel exceeds a pitch of each pixel.

20. The LADAR of claim 1 where each pixel of the laser light collected by said photodetectors is subdivided into several sub-pixels, and a response from each of the subpixels is separately amplified and analyzed.

21. The LADAR of claim 1 wherein said optical reception system comprises a micro-lens positioned in front of every detector.

22. The LADAR of claim 1 where each of said photo-detectors is armed after receipt of a first reflected pulse of light before being able to receive a next reflected light pulse, and wherein said photo-detectors are armed sequentially with a delay corresponding to a time for said scanned spot to sequentially move to each said center of said FOV of each said photo-detector.

23. The LADAR of claim 1 where a frequency of said scan exceeds 10 kHz.

24. The LADAR of claim 1 where a frequency of said scan exceeds 30 kHz.

25. The LADAR of claim 1 where each individual photo-detector is illuminated for no more than 60 nanoseconds during each scan.

26. The LADAR of claim 1 where each photo-detector is illuminated for no more than 20 nanoseconds during one scan.

27. The LADAR of claim 1 where the laser is a diode laser.

28. The LADAR of claim 1 where the laser emits eye-sate light with said wavelength exceeding 1400 nm.

29. A laser radar (LADAR) comprising:
a laser configured to emit a wavelength of light;
an optical transmission system configured to shape the light emitted by said laser into a beam, and to scan said beam along a fan of transmission light paths toward a target;
a 1-dimensional array of photo-detectors, capable of time-of-arrival measurements and sensitive to said wavelength of light emitted by said laser;
an optical reception system configured to collect said laser light reflected from the target onto said photo-detectors of said array along a fan of reception light paths;
an electronic control system configured to synchronize said scan of said beam with a respective time-of-arrival measurement from each said photo-detector, and to analyze said time-of-arrival measurements;
wherein all of said transmission light paths and all of said reception light paths lie in one plane;
wherein every said reception light path intersects with at least one of said transmission light paths; and
where the photodetectors are equipped with multiple time counters configured to record a time of the arrival of multiple light pulses reflected from multiple objects on the path of the laser beam.

30. The LADAR of claim 29, where an angle of a field of view (FOV) of each of said photo-detectors in the array in the direction of the array is the same as a divergence angle of said planar fan of transmission light paths in the same direction.

31. The LADAR of claim 29, where an angle of a field of view (FOV) of each of said photo-detectors in the array in a direction perpendicular to the direction of the array is the same as a divergence angle of said planar fan of transmission light paths in the same direction.

32. The LADAR of claim 29, where an angle of a field of view (FOV) of each of said photo-detectors in the direction of the array is the same as a total scan angle of said transmission system.

33. The LADAR of claim 29, where the laser is continuously on while the transmission path of said scan of said beam intersects the reception paths from all the detectors in the array.

34. The LADAR of claim 29, where the laser is pulsed at least once while the transmission path of said scan of said beam intersects the reception paths from each detector in the array.

35. The LADAR of claim 34, where each pulse of said laser is timed to coincide with a center of the laser beam being coincident with a center of a field of view (FOV) of one of said photo-detectors.

36. The LADAR of claim 35, where said timed laser pulses are automatically adjusted based on said analyzed time-of-arrival measurements from the array of photo-detectors.

37. The LADAR of claim 29, wherein said LADAR is placed on an aerial platform moving in the direction perpendicular to said plane containing the light paths of said transmission system.

38. The LADAR of claim 29, with a scanning mirror positioned in an optical path of the scanned laser beam, with an axis of rotation parallel to said plane containing the light paths of said transmission system.

39. The LADAR of claim 29 mounted on a rotational stage with an axis of rotation being parallel to said plane containing the light paths of said transmission system.

40. The LADAR of claim 29 where the photodetectors are Avalanche Photo Diodes (APD).

41. The LADAR of claim 40 where the photodetectors are Geiger-mode Avalanche Photo Diodes (APD).

42. The LADAR of claim 29 where the photodetectors are equipped with individual time counters configured to record a time of arrival of a first photon after a reset.

43. The LADAR of claim 29 wherein said transmission optical system comprises a mirror configured to produce said scan of said laser beam; and where the mirror is a mechanical resonant mirror.

44. The LADAR of claim 43 further comprising a system clock; and where a frequency of said system clock is an integer multiple of a frequency of said scan of said mirror.

45. The LADAR of claim 44 where the system clock is phase-locked to oscillations of said mechanical resonant mirror.

46. The LADAR of claim 29 where said optical transmission system comprises a non-mechanical beam scanner (NMBS) configured for said scan of said laser beam.

47. The LADAR of claim 29 where said optical transmission system is configured to form a scan line on a surface of a diffractive element, and for said scan line to be imaged onto the target through an optical element.

48. The LADAR of claim 29 wherein said optical system comprises a mirror configured to produce said scan of said laser beam; and where said optical system is configured for the laser beam to be focused on the mirror in a direction parallel to a scan axis of the mirror, and to then be re-collimated by a cylindrical lens.

49. The LADAR of claim 29 where a height of each pixel exceeds a pitch of each pixel.

50. The LADAR of claim 29 where each pixel of the laser light collected by said photodetectors is subdivided into several sub-pixels, and a response from each of the subpixels is separately amplified and analyzed.

51. The LADAR of claim 29 wherein said optical reception system comprises a micro-lens positioned in front of every detector.

52. The LADAR of claim 36 where each of said photo-detectors is armed after receipt of a first reflected pulse of light before being able to receive a next reflected light pulse, and wherein said photo-detectors are armed sequentially with a delay corresponding to a time for said scanned spot to sequentially move to each said center of said FOV of each said photo-detector.

53. The LADAR of claim 29 where a frequency of said scan exceeds 10 kHz.

54. The LADAR of claim 29 where a frequency of said scan exceeds 30 kHz.

55. The LADAR of claim 29 where each individual photo-detector is illuminated for no more than 60 nanoseconds during each scan.

56. The LADAR of claim 29 where each photo-detector is illuminated for no more than 20 nanoseconds during one scan.

57. The LADAR of claim 29 where the laser is a diode laser.

58. The LADAR of claim 29 where the laser emits eye-safe light with said wavelength exceeding 1400 nm.

59. A laser radar (LADAR) comprising:
a laser configured to emit a wavelength of light;
an optical transmission system configured to shape the light emitted by said laser into a beam, and to scan said beam along a fan of transmission light paths toward a target;
a 1-dimensional array of photo-detectors, capable of time-of-arrival measurements and sensitive to said wavelength of light emitted by said laser;
an optical reception system configured to collect said laser light reflected from the target onto said photo-detectors of said array along a fan of reception light paths;
an electronic control system configured to synchronize said scan of said beam with a respective time-of-arrival measurement from each said photo-detector, and to analyze said time-of-arrival measurements;
wherein all of said transmission light paths and all of said reception light paths lie in one plane;
wherein every said reception light path intersects with at least one of said transmission light paths; and
where each pixel of the laser light collected by said photodetectors is subdivided into several sub-pixels, and a response from each of the subpixels is separately amplified and analyzed.

60. The LADAR of claim 59, where an angle of a field of view (FOV) of each of said photo-detectors in the array in the direction of the array is the same as a divergence angle of said planar fan of transmission light paths in the same direction.

61. The LADAR of claim 59, where an angle of a field of view (FOV) of each of said photo-detectors in the array in a direction perpendicular to the direction of the array is the same as a divergence angle of said planar fan of transmission light paths in the same direction.

62. The LADAR of claim 59, where an angle of a field of view (FOV) of each of said photo-detectors in the direction of the array is the same as a total scan angle of said transmission system.

63. The LADAR of claim 59, where the laser is continuously on while the transmission path of said scan of said beam intersects the reception paths from all the detectors in the array.

64. The LADAR of claim 59, where the laser is pulsed at least once while the transmission path of said scan of said beam intersects the reception paths from each detector in the array.

65. The LADAR of claim 64, where each pulse of said laser is timed to coincide with a center of the laser beam being coincident with a center of a field of view (FOV) of one of said photo-detectors.

66. The LADAR of claim 65, where said timed laser pulses are automatically adjusted based on said analyzed time-of-arrival measurements from the array of photo-detectors.

67. The LADAR of claim 59, wherein said LADAR is placed on an aerial platform moving in the direction perpendicular to said plane containing the light paths of said transmission system.

68. The LADAR of claim 59, with a scanning mirror positioned in an optical path of the scanned laser beam, with an axis of rotation parallel to said plane containing the light paths of said transmission system.

69. The LADAR of claim 59 mounted on a rotational stage with an axis of rotation being parallel to said plane containing the light paths of said transmission system.

70. The LADAR of claim 59 where the photodetectors are Avalanche Photo Diodes (APD).

71. The LADAR of claim 70 where the photodetectors are Geiger-mode Avalanche Photo Diodes (APD).

72. The LADAR of claim 59 where the photodetectors are equipped with individual time counters configured to record a time of arrival of a first photon after a reset.

73. The LADAR of claim 59 where the photodetectors are equipped with multiple time counters configured to record a time of the arrival of multiple light pulses reflected from multiple objects on the path of the laser beam.

74. The LADAR of claim 59 wherein said transmission optical system comprises a mirror configured to produce said scan of said laser beam; and where the mirror is a mechanical resonant mirror.

75. The LADAR of claim 74 further comprising a system clock; and where a frequency of said system clock is an integer multiple of a frequency of said scan of said mirror.

76. The LADAR of claim 75 where the system clock is phase-locked to oscillations of said mechanical resonant mirror.

77. The LADAR of claim 59 where said optical transmission system comprises a non-mechanical beam scanner (NMBS) configured for said scan of said laser beam.

78. The LADAR of claim 59 where said optical transmission system is configured to form a scan line on a surface of a diffractive element, and for said scan line to be imaged onto the target through an optical element.

79. The LADAR of claim 59 wherein said optical system comprises a mirror configured to produce said scan of said laser beam; and where said optical system is configured for the laser beam to be focused on the mirror in a direction parallel to a scan axis of the mirror, and to then be re-collimated by a cylindrical lens.

80. The LADAR of claim 59 where a height of each pixel exceeds a pitch of each pixel.

81. The LADAR of claim 59 wherein said optical reception system comprises a micro-lens positioned in front of every detector.

82. The LADAR of claim 66 where each of said photo-detectors is armed after receipt of a first reflected pulse of light before being able to receive a next reflected light pulse, and wherein said photo-detectors are armed sequentially with a delay corresponding to a time for said scanned spot to sequentially move to each said center of said FOV of each said photo-detector.

83. The LADAR of claim 59 where a frequency of said scan exceeds 10 kHz.

84. The LADAR of claim 59 where a frequency of said scan exceeds 30 kHz.

85. The LADAR of claim 59 where each individual photo-detector is illuminated for no more than 60 nanoseconds during each scan.

86. The LADAR of claim 59 where each photo-detector is illuminated for no more than 20 nanoseconds during one scan.

87. The LADAR of claim 59 where the laser is a diode laser.

88. The LADAR of claim 59 where the laser emits eye-safe light with said wavelength exceeding 1400 nm.

* * * * *